(12) United States Patent
Brock

(10) Patent No.: US 6,489,919 B1
(45) Date of Patent: Dec. 3, 2002

(54) DETECTOR OF FAULTY RADAR TRANSMIT TUBES

(75) Inventor: David W. Brock, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 25 days.

(21) Appl. No.: 09/871,474

(22) Filed: May 31, 2001

(51) Int. Cl.[7] ................................................. G01S 7/40
(52) U.S. Cl. ........................................ 342/165; 342/173
(58) Field of Search ................................. 342/165, 166, 342/167, 168, 169, 170, 171, 172, 173, 174

(56) References Cited

U.S. PATENT DOCUMENTS

| | | | |
|---|---|---|---|
| 3,792,613 A | * 2/1974 | Couture ........................ 73/629 |
| 3,950,750 A | 4/1976 | Churchill et al. ............ 342/174 |
| 4,053,890 A | 10/1977 | Woodson, III et al. ...... 342/172 |
| 4,145,692 A | 3/1979 | Armstrong et al. .......... 342/173 |
| 4,319,247 A | 3/1982 | Warren ........................ 342/171 |
| 4,499,469 A | 2/1985 | Kesterson .................... 342/172 |
| 4,554,636 A | * 11/1985 | Maggi et al. ................ 702/118 |
| 4,994,811 A | 2/1991 | Moreira ....................... 342/205 |
| 5,012,251 A | 4/1991 | Kennedy et al. ............. 342/176 |
| 5,262,787 A | 11/1993 | Wilson et al. ............... 342/173 |
| 5,375,126 A | * 12/1994 | Wallace ....................... 714/712 |
| 5,969,664 A | 10/1999 | Bedford et al. ................ 342/37 |
| 6,177,904 B1 | 1/2001 | Coenen et al. ................. 342/62 |

FOREIGN PATENT DOCUMENTS

GB          2228577 A    *  8/1990

* cited by examiner

Primary Examiner—John B. Sotomayor
(74) Attorney, Agent, or Firm—Michael A. Kagan; Peter Lipovsky; Andrew J. Cameron

(57) ABSTRACT

Radar tubes are assessed based upon an observation that faulty radar pulses have a significantly increased content of undesired high frequency components in their cathode current sensed at the cathode lead of an operating radar transmitting tube.

The invention exploits this observation in a simple, relatively low-cost device that can be built into a radar system to be put under test. The current at the transmitting tube's cathode is high-pass filtered to pass only those frequency components known to be indicative of faulty transmitting tubes. The filter output is converted into an analog output having an amplitude proportional to the amplitude of the high frequency voltage components passing through the filter. The high-pass output is smoothed and is fed to an analog-input, digital-output threshold amplifier. The threshold amplifier provides a TTL output that indicates whether its smoothed input amplitude represents a good radar pulse or a faulty pulse. The TTL logic output is then provided to a processor which uses predetermined algorithms to assess the condition of the transmitting tube based upon the rate of occurrence of the bad radar pulses. The output of the processor is made available for observation by the radar system's operator.

20 Claims, 1 Drawing Sheet

DETECTOR OF FAULTY RADAR TRANSMIT TUBES

BACKGROUND OF THE INVENTION

This invention relates generally to radar systems and more particularly to active radar transmitting systems. More specifically, for example, the invention relates to a detector for detecting faulty radar transmitting tubes of high-power radar transmitting systems.

In the past, the U.S. Navy has employed expensive diagnostic equipment to assess whether certain high-power, pulsing type, microwave radar transmitting systems are working as intended. Such techniques employed, for example, expensive digitizing oscilloscopes and spectrum analyzers each costing over $25,000. Use of such equipment can be cumbersome and taxing at inopportune times.

There is a need for a low-cost test device that can be built into radar systems wherein testing can be performed on an active system in real-time with minimal complexity and cost.

SUMMARY OF THE INVENTION

The invention is designed to test whether a radar, pulse type, transmitting tube is faulty or not. This assessment is based upon an observation that faulty radar pulses have a significantly increased content of undesired high frequency components in their cathode current sensed at the cathode lead of an operating radar transmitting tube.

The invention exploits this observation by sensing the current at the transmitting tube's cathode and by high pass filtering only those frequency components known to be indicative of faulty transmitting tubes.

The filter output is fed to a detector that converts the analog output of the filter into a rectified output that is proportional to the amplitude of the high frequency voltage components passing through the filter. The high-pass output is smoothed and the smoothed output is fed to an analog-input, digital output threshold amplifier. The threshold amplifier provides a TTL output that corresponds to a smoothed amplitude that is considered to represent a good radar pulse or to a smoothed amplitude value representing a faulty pulse. The TTL logic output then is input to a digital data processor which uses predetermined algorithms to assess the condition of the transmitting tube based upon the rate of occurrence of the bad radar pulses. The output of the processor is then sent to a data collection and storage system whose files are available for observation by a radar system operator.

An object of this invention is to provide a device for testing radar systems.

Another object of this invention is provide a device for testing radar systems that is relatively simple and inexpensive.

Still another object of the invention is to provide a built-in device for testing radar systems.

A further object of the invention is to provide a device that tests the transmitting tube of a radar system.

Still yet another object of this invention is to provide a device that tests the transmitting tube of a radar system by exploiting a characteristic of faulty radar pulses.

Still a further object of this invention is to provide a device that tests the transmitting tube of a radar system by assessing the current characteristics as provided at the cathode of the tube.

Other objects, advantages and new features of the invention will become apparent from the following detailed description of the invention when considered in conjunction with the accompanied drawing.

DESCRIPTION OF THE PREFERRED EMBODIMENT

Figure 1:
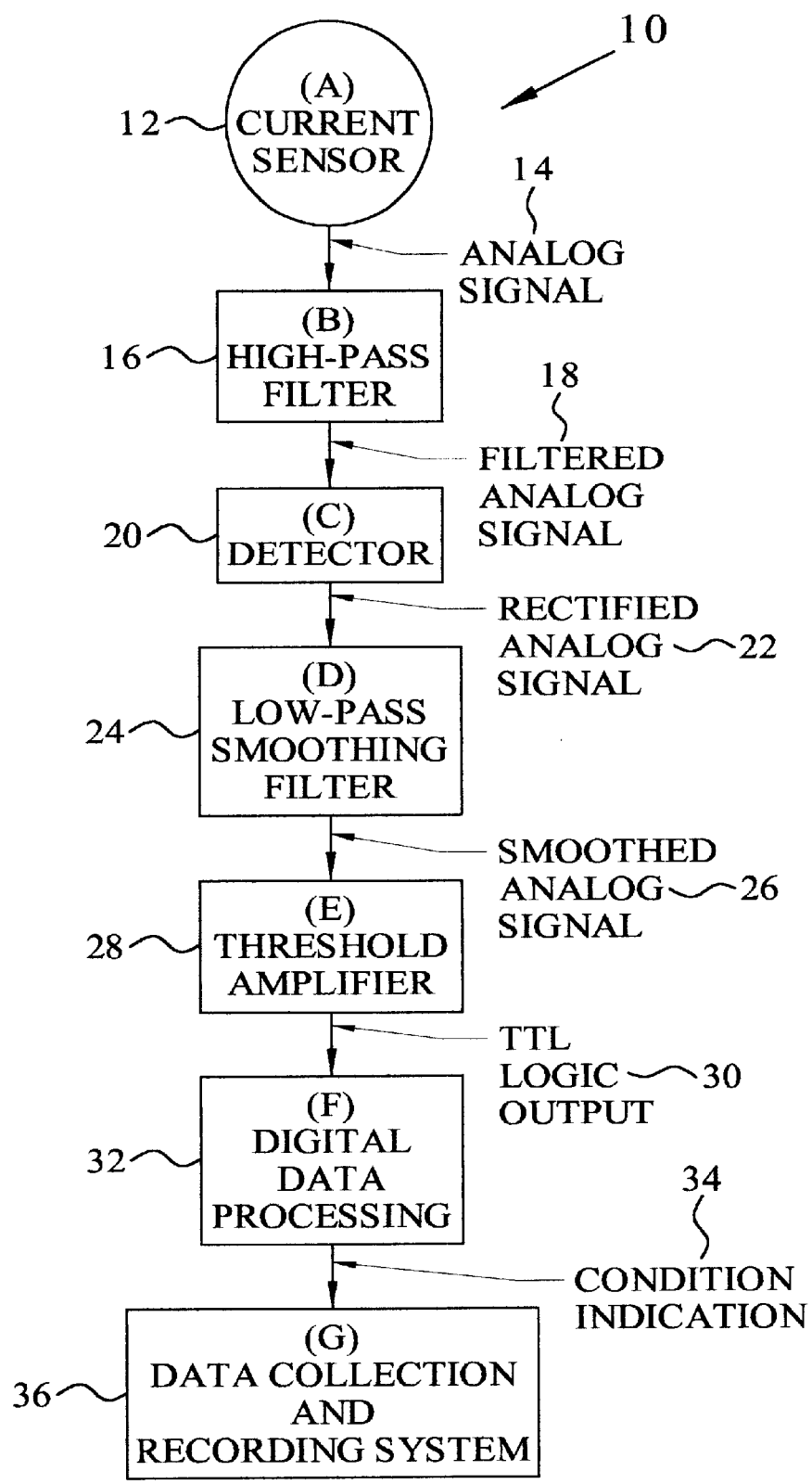
FIG. 1 is a block diagram view of a radar tube test device according to one embodiment of the invention.

Referring to FIG. 1, a system 10 for detecting a faulty transmitting tube of a radar system is shown by way of example. System 10 lends itself to be incorporated as a single purpose electronic circuit that can be built directly into radar system electronics.

System 10 uses a conventional current sensor 12 that is applied directly to the cathode of a radar transmitting tube under test. Typical tubes used in high power radio frequency applications incorporate a pulse type microwave amplifier to amplify a radar signal. An example of this is known as a pulsed magnetron tube that typically operates in the 8 GHz–9 GHz transmitting frequency range. Though this specific type of tube is provided as an example, the invention is considered useful for all frequency rages and with a great variety of tubes, pulsed and otherwise.

The output of sensor 12 is an analog voltage signal 14. Signal 14 is fed to a high-pass filter 16 used to pass frequency components known to be indicative of faulty radar pulses. As earlier described, the inventor has observed that faulty radar pulses have a significantly increased content of undesired high frequency components that are directly related to the current sensed at the transmitting tube's cathode lead.

For microwave frequency radar transmissions of the previously cited pulsed magnetron tube, a suitable filter, for example, is a Chebyshev design that blocks frequency components below 8 MHZ and passing those above 8 MHz. Filtered analog voltage output 18 is fed to a detector 20, wherein a rectified analog output voltage 22 is produced whose amplitude is proportional to the amplitude of the high frequency components passing through high-pass filter 16.

A smoothing operation is next performed wherein rectified voltage 22 is fed to a low-pass smoothing filter 24 to take out undesired fluctuations generated by the rectified detection process. Selection of such a smoothing filter is considered within the discretion of one skilled in the art, however, for example, it is know that for microwave radar transmissions, a suitable filter is a 15 MHZ low-pass.

Though the output of filter 24 may be used directly for analysis purposes, a preferred embodiment of the invention employs a threshold operation to facilitate use of the test data. For example, smoothed analog output voltage 26 can be provided as an input to a threshold amplifier 28 having a logic output 30 of the TTL (transistor-transistor logic) type.

In this example, if the amplitude of the analog voltage going into amplifier 28 is less than 0.3 volts, the amplifier generates a TTL output 30 of 0 (voltage<0.8 volts) indicating a good radar pulse. If the amplitude of a pulse going into amplifier 28 is greater than 0.3 volts, then the amplifier generates a TTL output 30 of 1 (voltage>2.0 volts) indicating that the pulse from the radar was bad.

The TTL logic output 30 from threshold amplifier 28 then goes to a digital data processor 32, which uses predetermined algorithms to assess the condition of the transmitting tube based upon the rate of occurrence of the bad radar pulses. These algorithms are considered within the purview of those skilled in the art and can be statistically and/or empirically derived. An output of the processor 34 is then sent to a data collection and storage system 36 whose files for observation by a radar system operator.

Though the invention has been described by example as usable with radar transmitting systems using microwave transmitting frequencies, the invention is also considered usable with other radar systems that also employ radar transmitting tubes of other frequencies. Further, the invention is considered highly usable with pulsed type transmitting tubes, however other types of tubes are also considered usable with the invention.

An advantage of the invention is its ability to be used as a built-in device, saving the logistical expense of employing oscilloscopes and spectrum analyzers. The invention is also considerably less costly than this prior art approach.

Obviously, many modifications and variations of the invention are possible in light of the above description. It is therefore to be understood that within the scope of the claims the invention may be practiced otherwise than as has been specifically described.

What is claimed is:

1. An apparatus for detecting a faulty radar transmitting tube of an operating radar transmitting system comprising:
    a radar transmitting system including a radar transmitting tube having a cathode; and
    means for processing current sensed at said cathode wherein current corresponding to radar pulses having predetermined high frequency components are considered indicative of a faulty radar tube.

2. The apparatus of claim 1 wherein said radar transmitting tube is a pulsed magnetron tube.

3. A method for detecting a faulty radar transmitting tube comprising:
    sensing the current at a radar transmitting tube cathode of an operating radar transmitting system; and
    equating current corresponding to radar pulses having predetermined high frequency components as indicative of a faulty radar tube.

4. The method of claim 3 wherein said radar transmitting tube is a pulsed magnetron tube.

5. An apparatus for detecting a faulty radar transmitting tube of a radar system, said tube having a cathode, the apparatus comprising:
    cathode current sensing means for sensing the current at said cathode of said radar tube while operating said radar system and for converting said sensed current into an analog voltage value;
    filter means for blocking all of said analog voltage values that correspond to current frequency components that fall below a predetermined level and for allowing passage of all of said analog voltage values corresponding to current frequency components that rise above said predetermined value;
    detector means including analog voltage rectifier means for producing a rectified analog voltage whose amplitude is proportional to the amplitude of said analog voltage values passing through said high pass filter means;
    smoothing filter means for smoothing fluctuations in said rectified analog voltage to produce a smoothed rectified analog voltage;
    threshold means for representing all smoothed rectified analog voltages that fall below a predetermined level as a preselected value indicative of a good radar tube and for representing all smoothed rectified analog voltages that rise above said predetermined level as a preselected value indicative of a faulty radar tube;
    data processing means for assessing the condition of said radar transmitting tube based upon the rate of occurrence of faulty tube representations as provided by said threshold means; and
    operator display means for displaying said digital data processing assessment.

6. The apparatus of claim 5 wherein said radar transmitting tube is a pulsed magnetron tube.

7. An apparatus for detecting a faulty radar transmitting tube of a radar system, said tube having a cathode, the apparatus comprising:
    a cathode current sensor for sensing the current at said cathode of said radar tube while operating and for converting said sensed current into an analog voltage value;
    a high pass filter for blocking all of said analog voltage values that correspond to current frequency components that fall below a predetermined level and for allowing passage of all of said analog voltage values corresponding to current frequency components that rise above said predetermined value;
    a detector including analog voltage rectifier means for producing a rectified analog voltage whose amplitude is proportional to the amplitude of said analog voltage values passing through said high pass filter means;
    a smoothing filter for smoothing fluctuations in said rectified analog voltage to produce a smoothed rectified analog voltage;
    a threshold amplifier for representing all smoothed rectified analog voltages that fall below a predetermined level as indicative of a good radar tube and for representing all smoothed rectified analog voltages that rise above a predetermined level as indicative of a faulty radar tube;
    a processor for assessing the condition of said radar transmitting tube based upon the rate of occurrence of said faulty radar tube representations; and
    an operator display for displaying said processing assessment.

8. The apparatus of claim 7 wherein said radar tube is a pulsed magnetron tube.

9. The apparatus of claim 8 wherein said pulsed magnetron tube operates in the 8 MHz–9 MHz frequency range.

10. The apparatus of claim 8 said high pass filter means includes a Chebyshev high pass filter.

11. The apparatus of claim 9 wherein said high pass filter is a Chebyshev filter that blocks frequency components below 8 MHZ and passes frequency components above 8 MHZ.

12. The apparatus of claim 10 wherein said smoothing filter is a 15 MHZ low-pass filter.

13. The apparatus of claim 7 wherein said threshold amplifier is an analog-input, digital-output threshold amplifier for representing all smoothed rectified analog voltages that fall below a predetermined level as a first binary digit indicative of a good radar tube and for representing all smoothed rectified analog voltages that rise above said predetermined level as a second binary digit indicative of a faulty radar tube.

14. A method for detecting a faulty radar tube of a radar transmitting system wherein said radar transmitting tube has a cathode, the method comprising:

sensing the current at said cathode of said radar tube during operation of said radar transmitting system and converting said sensed current into an analog voltage value;

filtering said analog voltage values to filter out all of said analog voltage values that correspond to current frequency components that fall below a predetermined level and for allowing passage of all of said analog voltage values corresponding to current frequency components that rise above said predetermined value;

voltage rectifying said analog voltage values passing through said filtering to produce a rectified analog voltage whose amplitude is proportional to the amplitude of said analog voltage values passing through said high pass filtering;

smoothing said rectified analog voltage to produce a smoothed rectified analog voltage;

thresholding all smoothed rectified analog voltages falling below a predetermined level as being indicative of a good radar pulse, and thresholding all smoothed rectified analog voltages rising above said predetermined level as indicative of a faulty radar pulse;

assessing the condition of said radar transmitting tube based upon the rate of occurrence of said faulty pulses as determined in said thresholding step; and displaying said assessed data.

15. The method of claim 14 wherein said radar tube is a pulsed magnetron tube.

16. The method of claim 15 wherein said pulsed magnetron tube operates in the 8 MHz–9 MHz frequency range.

17. The method of claim 15 wherein said step of filtering includes filtering with a Chebyshev high pass filter.

18. The method of claim 16 wherein said step of filtering includes filtering with a Chebyshev filter that blocks frequency components below 8 MHZ and passes frequency components above 8 MHZ.

19. The method of claim 18 wherein said step of smoothing includes filtering with a smoothing filter that is a 15 MHZ low-pass filter.

20. The method of claim 10 wherein said threshold amplifier is an analog-input, digital-output threshold amplifier for representing all smoothed rectified analog voltages that fall below a predetermined level as a first binary digit indicative of a good radar tube and for representing all smoothed rectified analog voltages that rise above said predetermined level as a second binary digit indicative of a faulty radar tube.

* * * * *